(12) United States Patent
Prevoteau et al.

(10) Patent No.: US 12,480,235 B2
(45) Date of Patent: Nov. 25, 2025

(54) TEXTILE STRUCTURE BASED ON GLASS FIBERS FOR ACOUSTIC CEILING OR ACOUSTIC WALL PANEL

(71) Applicant: SAINT-GOBAIN ADFORS, Courbevoie (FR)

(72) Inventors: Alexandre Prevoteau, Paris (FR); Sylvain Berger, Paris (FR); Gwladys Cornu, Livry-Gargan (FR)

(73) Assignee: SAINT-GOBAIN ADFORS, Courbevoie (FR)

( * ) Notice: Subject to any disclaimer, the term of this patent is extended or adjusted under 35 U.S.C. 154(b) by 838 days.

(21) Appl. No.: 17/057,833

(22) PCT Filed: Jun. 3, 2019

(86) PCT No.: PCT/FR2019/051295
§ 371 (c)(1),
(2) Date: Nov. 23, 2020

(87) PCT Pub. No.: WO2019/234334
PCT Pub. Date: Dec. 12, 2019

(65) Prior Publication Data
US 2021/0115603 A1 Apr. 22, 2021

(30) Foreign Application Priority Data
Jun. 5, 2018 (FR) ...................................... 1854886

(51) Int. Cl.
*D04H 1/4218* (2012.01)
*D04H 3/004* (2012.01)
*E04B 1/84* (2006.01)
*E04B 9/00* (2006.01)
*E04B 9/04* (2006.01)

(52) U.S. Cl.
CPC ........... *D04H 1/4218* (2013.01); *D04H 3/004* (2013.01); *E04B 1/8409* (2013.01); *E04B 9/001* (2013.01); *E04B 9/045* (2013.01); *E04B 2001/8461* (2013.01)

(58) Field of Classification Search
CPC .............. B32B 17/04; B32B 2260/025; B32B 2262/101; B32B 2515/085; D04H 1/4218; D04H 3/004; E04B 1/8409; E04B 9/001; E04B 2001/8461; C09D 7/67; C09D 7/68
See application file for complete search history.

(56) References Cited

U.S. PATENT DOCUMENTS

| | | | | |
|---|---|---|---|---|
| 5,318,990 A | * | 6/1994 | Strauss | ...................... C08F 8/14 525/327.7 |
| 6,284,351 B1 | * | 9/2001 | Sensenig | ................ C09D 5/028 428/206 |
| 2004/0062898 A1 | | 4/2004 | Felegi, Jr. et al. | |
| 2004/0121075 A1 | | 6/2004 | Grove, III et al. | |
| 2005/0202742 A1 | | 9/2005 | Smith et al. | |
| 2006/0099383 A1 | * | 5/2006 | Connelly | ................... B32B 5/30 428/141 |
| 2006/0128863 A1 | | 6/2006 | Felegi, Jr. et al. | |
| 2008/0014815 A1 | * | 1/2008 | Geel | ....................... D04H 1/732 442/59 |
| 2009/0084514 A1 | | 4/2009 | Smith et al. | |
| 2009/0117275 A1 | | 5/2009 | Grove, III et al. | |
| 2009/0275250 A1 | | 11/2009 | Smith et al. | |
| 2010/0221524 A1 | | 9/2010 | Smith et al. | |
| 2010/0227137 A1 | | 9/2010 | Smith et al. | |
| 2011/0042163 A1 | * | 2/2011 | Serre | ....................... C04B 26/02 521/149 |
| 2011/0147119 A1 | | 6/2011 | Cao et al. | |
| 2011/0206918 A1 | | 8/2011 | Smith et al. | |
| 2015/0330072 A1 | | 11/2015 | Kragness et al. | |

(Continued)

FOREIGN PATENT DOCUMENTS

CN 108384343 A * 8/2018 ........... C09D 133/00
EP 1403330 A1 3/2004

(Continued)

OTHER PUBLICATIONS

Machine translation of JP H10331286 via EPO (Year: 1998).*
Machine translation of CN 108384343 via EPO (Year: 2018).*
Tang et al., "Airflow resistance of acoustical fibrous materials: Measurements, calculations, and applications", doi:10.1177/1528083718805714. (Year: 2018).*
International Search Report issued Sep. 30, 2019 in PCT/FR2019/051295 (with English translation), 7 pages.

*Primary Examiner* — Laura C Powers
*Assistant Examiner* — Rebecca L Grusby
(74) *Attorney, Agent, or Firm* — Element IP, PLC

(57) ABSTRACT

The invention relates to a textile structure, intended to be used as a sound-absorbing structure in acoustic ceiling panels and/or acoustic wall panels, consisting of (a) a nonwoven mat of glass fibers bound by a thermoset binder, the nonwoven mat having a surface density of between 20 and 200 g/m² and (b) a continuous acoustic layer comprising from 80% to 95% by weight of particles, preferably mineral particles, and from 5% to 20% by weight of a thermoplastic polymer and/or elastomer binder, the textile structure having an open porosity of greater than 3%, preferably between 4% and 60%, and a static airflow resistance (determined according to the standard ISO 9053) of between 1000 and 3000 N·s·m⁻³, said continuous acoustic layer at least partially impregnating said nonwoven mat, and the particle size distribution of the particles having a $D_{10}$ of between 0.1 and 0.5 μm.

It also relates to a process for manufacturing such a textile structure and to a ceiling panel or wall panel coated on one of these faces with such a textile structure.

20 Claims, No Drawings

(56) References Cited

U.S. PATENT DOCUMENTS

| | | | |
|---|---|---|---|
| 2016/0138264 A1 | 5/2016 | Kragness et al. | |
| 2016/0318299 A1* | 11/2016 | Arai | B41J 2/01 |
| 2020/0190795 A1* | 6/2020 | Masia | E04B 1/86 |
| 2021/0363693 A1* | 11/2021 | Lacamera | D21H 21/18 |
| 2021/0375251 A1* | 12/2021 | Lee | B32B 5/022 |

FOREIGN PATENT DOCUMENTS

| | | | |
|---|---|---|---|
| EP | 1431068 A2 | | 6/2004 |
| JP | 10331286 A | * | 12/1998 |

* cited by examiner

TEXTILE STRUCTURE BASED ON GLASS FIBERS FOR ACOUSTIC CEILING OR ACOUSTIC WALL PANEL

The invention relates to a textile structure formed by a nonwoven mat of glass fibers that is coated or impregnated with a layer formed of particles bound by an elastomer or a thermoplastic polymer. This textile structure has, owing to its open porosity and its static airflow resistance, advantageous sound absorption properties and may be used as rear facing of acoustic ceiling boards or of acoustic wall panels.

The concept of "acoustic comfort", like the idea of comfort in general, is a relatively subjective concept. However, it is generally agreed to define good acoustic comfort by a good intelligibility of sounds such as human voices or music, a reverberation time that is neither too short to avoid the impression of muffled sounds, nor too long to avoid a residual echo that is too pronounced, and the absence of sound having an excessive sound power. The quality of the acoustic comfort is mainly governed by the attenuation of sounds using sound-absorbing materials, fixed for example to the walls and/or to the floor.

The two most used parameters for evaluating the quality of acoustic comfort are the reverberation time and the sound absorption coefficient, also referred to as the Alpha Sabine index ($\alpha_w$). The latter is defined as the ratio of the sound energy absorbed by a given material to the incident sound energy ($E_a/E_i$). The Alpha Sabine index is determined by diffuse field measurements carried out according to the standard NF EN ISO 354 (Measurement of sound absorption in a reverberation room) and is calculated in accordance with the standard NF EN ISO 11654 (Absorbers for use in buildings—Rating of sound absorption).

From the sound absorption coefficient obtained in a diffuse field, various classes of performance are defined, described in the standard NF EN ISO 11654.

"Acoustic" ceilings, also referred to as "phonic" ceilings are known that consist of perforated rigid boards, coated on their hidden face with a nonwoven mat or a material based on cellulosic fibers, in particular based on paper, referred to hereinafter as facing.

The company Saint-Gobain Placo thus sells, under the trademark Rigitone®, ceilings based on perforated plaster boards, and the company Saint-Gobain Plafometal sells, under the trademark PlafoMetal® or Gabelex®, ceilings based on perforated metal plates. On the market there are also acoustic ceilings based on perforated PVC or wooden boards. The rear facing of the Rigitone® boards is a nonwoven made of cellulosic fibers and polyester fibers.

An acoustic ceiling resulting from the lamination of a sheet of paper or a nonwoven on the rear face of a perforated plasterboard is described for example in applications/patents U.S. Pat. No. 8,684,134, WO2007/055835 and U.S. Pat. No. 8,739,992.

In the context of their research that aims to continuously improve the sound absorption performance of such laminated ceilings, the applicant has discovered, owing to semiempirical models and simulations, that the acoustic performance of such ceilings depends mainly on the characteristics of the laminated facing and not on the characteristics of the rigid board;

the two parameters of the facing which are decisive for the acoustic performance are the open porosity of the material and the static airflow resistance;

the open porosity must be greater than a threshold value below which the sound wave does not penetrate into the material and is simply reflected by this material;

the static airflow resistance must be between a minimum value and a maximum value.

However, this knowledge alone is only a starting point for developmental studies carried out by the applicant that aim to propose facing products that have the required technical characteristics, namely an open porosity greater than the minimum threshold of 5% and a static airflow resistance that is neither too low nor too high.

The applicant has developed a textile structure consisting of an acoustic membrane supported by a nonwoven mat of glass fibers that is acoustically transparent, and which, when it is laminated to the rear face of a perforated ceiling panel or a perforated wall panel, significantly improves the sound attenuation properties of the panel thus obtained.

The acoustic membrane, also referred to hereinbelow as a "continuous acoustic layer" or more simply "acoustic layer", mainly consists of:

particles having a chosen particle size and a small amount of a polymer binder which binds the particles to one another so as to give the membrane sufficient mechanical cohesion, without however filling all of the intergranular space. Owing to the incomplete filling of the intergranular space, the acoustic layer is the site of a continuous porous system (open porosity) which enables the penetration of sound waves.

One subject of the present application is consequently a textile structure, intended to be used as a sound-absorbing structure in acoustic ceiling panels and/or acoustic wall panels, consisting of (a) a nonwoven mat of glass fibers bound by a thermoset binder, the nonwoven mat having a surface density of between 20 and 200 g/m² and (b) a continuous acoustic layer comprising from 80% to 95% by weight of particles, preferably mineral particles, and from 5% to 20% by weight of a thermoplastic polymer and/or elastomer binder, the textile structure having an open porosity of greater than 3%, preferably between 4% and 60%, and in particular between 5 and 55%, and a static airflow resistance (determined according to the standard ISO 9053) of between 1000 and 3000 N·s·m$^{-3}$, said continuous acoustic layer at least partially impregnating said nonwoven mat, and the particle size distribution of the particles having a $D_{10}$ of between 0.1 and 0.5 µm.

Another subject of the present application is a process for manufacturing such a textile structure. This manufacturing process comprises providing a nonwoven mat of glass fibers bound by a thermoset binder, having a surface density of between 20 and 200 g/m², preparing an aqueous impregnating composition comprising the mixture of 80% to 95% by weight of solids of particles, preferably mineral particles, and of 5% to 20% by weight of solids of a thermoplastic polymer and/or elastomer binder, in latex form, the impregnating composition having a solids content of between 35% and 70% by weight and the particle size distribution of the particles having a $D_{10}$ of between 0.1 and 0.5 µm, applying the aqueous impregnating composition to at least one face of the nonwoven mat of glass fibers so as to form a layer of aqueous impregnating composition, drying and/or crosslinking the layer of aqueous impregnating composition so as to obtain a continuous acoustic layer comprising from 80% to 95% by weight of particles and from 5% to 20% by weight of a thermoplastic polymer and/or elastomer binder.

A final subject of the application is a laminated panel comprising
- a board made of a rigid material comprising a plurality of perforations, and
- a textile structure as described above, laminated to a single face of the perforated board so as to seal all of the perforations.

The continuous acoustic layer of the textile structure of the present invention is a membrane with open porosity, i.e. a type of foam where all the cells, or almost all, are in communication with one another. The measurement of this open porosity does not come under any standards, and the method which has been used to characterize the acoustic layer is based on the one described in the article by L. L. Beranek in "*Acoustic impedance of porous materials*", *J. Acoust. Soc. Am.* 13:248-260, 1942.

The open porosity of the foam must be as high as possible. This is because it is at the interface between the walls of the foam and the air inside the foam that the sound is absorbed. The greater the area of this sound-accessible interface, the better the sound absorption coefficient ($\alpha_w$) will be.

The nonwoven mat of glass fibers is acoustically transparent, i.e. it has no sound attenuation or sound absorption function, and serves solely as support for the continuous acoustic layer. It gives the textile structure good mechanical strength and enables it to be handled easily.

Its static airflow resistance, determined according to the ISO 9053 standard, is very low in comparison with that of the continuous acoustic layer, namely it is advantageously less than 50 N·s·m$^{-3}$, preferably between 5 and 50 N·s·m$^{-3}$ and in particular between 10 and 30 N·s·m$^{-3}$.

Its air permeability, determined according to the EN ISO 9237 standard (pressure of 200 Pa) is very high relative to that of the acoustic layer, namely preferably between 5000 and 6000 L/(m$^2$·s).

The nonwoven mat, before receiving the acoustic layer, advantageously has a surface density of between 25 and 150 g/m$^2$, preferably between 30 and 100 g/m$^2$, in particular between 40 and 80 g/m$^2$.

It is formed of short fibers which measure at the very most a few centimeters. Advantageously at least 90% by number of the glass fibers forming the nonwoven mat have a length of between 5 mm and 12 cm, preferably of between 1 cm and 11 cm, in particular of between 1.5 and 10 cm.

The mean diameter of the glass fibers forming the nonwoven mat is advantageously between 3 and 30 µm, preferably between 5 and 20 µm, and in particular between 8 and 15 µm.

The glass fibers are bound by a thermoset polymer binder, for example a binder obtained by curing an acrylic resin or a formaldehyde-based resin such as phenol-formaldehyde, urea-formaldehyde and melamine-formaldehyde resins.

The binder content of the nonwoven mat, expressed by the loss on ignition, is generally between 5 and 40% by weight, preferably between 7 and 30% by weight, in particular between 10 and 25% by weight, these percentages being expressed relative to the total weight of the nonwoven mat, namely relative to the sum of the weight of the glass fibers and of the weight of the organic binder.

To manufacture the textile structure that is the subject of the present application an aqueous composition comprising the essential ingredients of the continuous acoustic layer, namely the particles and the thermoplastic polymer and/or elastomer binder, the latter being introduced in the form of latex, is deposited on the nonwoven mat of glass fibers described above.

The particles are preferably mineral particles, for example particles based on titanium oxide, magnesium oxide and/or aluminum oxide, calcium carbonate particles, or else kaolins, dolomites, talcs. In particular, finely ground calcium carbonate particles are preferred.

During the tests, the inventors observed that in order to obtain a layer with a fine open porosity of at least 5% and a static airflow resistance within the range of 1000 to 3000 N·s·m$^3$, it was possible to act on the water content of the impregnating composition and/or on the particle size distribution of the powder of mineral particles.

It has turned out that the presence of a certain proportion of very small particles, having a median size ($D_{50}$) close to 1 µm favored the formation of a layer having the required technical characteristics.

These very small mineral particles could be used alone or in combination with larger particles, having median sizes ($D_{50}$) of between 4 and 25 µm.

Consequently, in one embodiment of the present invention, the particle size distribution of the mineral particles is a unimodal distribution (with a single maximum) having a median diameter by volume ($D_{50}$), determined by laser particle size analysis, between 0.8 and 1.5 µm, a $D_{10}$ of between 0.1 and 0.5 µm and a $D_{98}$ of between 5.5 and 6.5 µm.

In another advantageous embodiment of the present invention, the particle size distribution of the mineral particles is an at least bimodal distribution (two maxima) with a first mode (maximum) located between 0.5 and 2.0 µm and a second mode located between 4 and 25 µm.

When the particle size distribution is a bimodal or multimodal distribution, the $D_{10}$ is advantageously between 0.1 and 0.5 µm and the $D_{98}$ is advantageously between 20 and 150 µm.

The applicant has observed that the greater the proportion of very small particles having a diameter of between 0.5 and 2 µm, the more the airflow resistance of the continuous acoustic layer increased. It is thus possible to adjust the static airflow resistance of the acoustic layer by acting on the fraction of particles having diameters between 0.5 and 2 µm.

Another parameter which makes it possible to adjust the static airflow resistance, and also the open porosity, is the water content of the aqueous impregnating composition used for the formation of the acoustic layer. The greater its water content, i.e. the lower its solid content, the greater the open porosity of the layer formed and the more the static airflow resistance decreases.

Without wishing to be bound by a particular theory, the applicant believes that the evaporation of the water creates, in the continuous acoustic layer, a network of pores in communication with one another.

The water content of the impregnating composition and the proportion of very small particles thus constitute two parameters of the manufacturing process that make it possible to easily adjust the airflow resistance to a value within the claimed range.

For the preparation of the aqueous impregnating compositions, the mineral particles are suspended in water and mixed with a latex in proportions such that the particles represent from 80% to 95% by weight of the solids of the composition and the latex represents from 5% to 20% by weight of the solids of the latex composition.

The latex is preferably an elastomer latex and in particular a latex based on styrene-butadiene rubber (SBR) or a latex based on acrylic polymer.

It is possible to use a surfactant, generally less than 0.5% of the dry weight of the impregnating composition, to facilitate the dispersion of the particles in water.

The Brookfield viscosity (determined at 20° C.) of this impregnating composition, at the moment when the latter is applied to the nonwoven mat, is preferably between 10 and 30 Pa·s.

Its solid content is advantageously between 45% and 70% by weight, preferably between 50% and 65% by weight, ideally between 55% and 63% by weight.

The viscosity may easily be adjusted by addition of water or by addition of a water-soluble organic thickener, for example a water-soluble derivative of cellulose, for example hydroxyethyl cellulose. The optimal viscosity of the impregnating composition depends on the structure of the nonwoven mat. The more closed the structure of the latter, the more fluid the impregnating composition can be without passing through the nonwoven mat. Conversely, for nonwoven mats having a more open structure, it is naturally advisable to thicken the impregnating composition.

The impregnation of the nonwoven mat with the impregnating composition may be carried out by any technique customarily used in the field of coating textiles, for example by knife coating, curtain coating, dip coating or pad coating.

The amount of impregnating composition applied is such that the continuous acoustic layer has, after drying and/or crosslinking, a surface density of between 100 g/m² and 400 g/m², preferably of between 150 g/m² and 350 g/m², in particular of between 200 and 300 g/m².

The textile structure consisting of the nonwoven mat of glass fibers and the continuous acoustic layer generally has a surface density of between 120 g/m² and 500 g/m², preferably of between 150 g/m² and 400 g/m², in particular of between 200 and 350 g/m².

After drying and/or crosslinking of the continuous acoustic layer, the textile structure is bonded to the sole face of a panel or of a board comprising a multitude of perforations.

The panel or board preferably consist of one or more materials chosen from the group formed by plaster, metals, plastics such as poly(vinyl chloride) and wood. Plaster constitutes a particular preferred material.

The perforations made in the panel may have any shape, for example a circular, triangular, rectangular or irregular shape. They may all have the same dimensions or else different dimensions. The area of each perforation is generally between 0.1 and 5 cm², preferably between 2 and 4 cm².

These perforations generally occupy from 3% to 50%, preferably from 5% to 30% of the total area of the panel.

The laminated panels thus obtained may be used as acoustic ceiling panels or acoustic wall panels. They are used so that the face bearing the textile structure is on the hidden face of the panel, i.e. the face which is turned toward the ceiling or the wall of the room or of the building.

The acoustic panels of the present invention may also bear, on their face showing, i.e. on their visible face, an acoustically transparent facing which serves only to modify the visual appearance of the walls or ceilings.

EXAMPLES

Several aqueous impregnating compositions are prepared by dispersing in water calcium carbonate particles of different particle sizes and a styrene-butadiene latex. To obtain a good dispersion of the calcium carbonate particles in water, around 0.2% by weight (solids) of an anionic surfactant (Dowfax 2A1, alkyldiphenyloxide disulfonate) is added to the dispersion The calcium carbonate powders are obtained from the company Mikhart.

|  | $D_{50}$ | $D_{98}$ |
|---|---|---|
| Mikhart ® MU12 (MU12) | 1.2 μm | 6 μm |
| Mikhart ® 5 (M5) | 5 μm | 20 μm |
| Mikhart ® 10 (M10) | 9 μm | 45 μm |
| Mikhart ® 15 (M15) | 17 μm | 125 μm |

The mixture thus obtained is stirred for 10 minutes at 500 rpm, then 0.2% by weight (solids) of hydroxyethyl cellulose (Tylose®), which acts as thickener, is introduced therein. It is mixed again for 10 minutes at 2000 rpm.

Thus aqueous impregnating compositions of homogeneous appearance are obtained that contain 8.1% by weight (of solids) of styrene-butadiene latex and 91.5% by weight (of solids) of calcium carbonate particles.

These compositions are deposited by knife coating on a nonwoven mat of glass fibers having a surface density of 50 g/m².

The nonwoven mat thus coated is dried for 2 minutes at a temperature of 180° C. The acoustic textile structures obtained have a surface density of between 140 and 350 g/m².

Next the open porosity and the static airflow resistance of the textile structures thus prepared are determined.

All the textile structures have an open porosity of between 10% and 50%.

Table 1 shows the static airflow resistance (according to ISO 9053) for various mixtures of mineral particle powders and for various solids contents of the impregnating compositions.

TABLE 1

|  | CaCO₃ powder | Weight ratio | Solids (%) | Viscosity (Pa · s) | Static resistance (N · s · m⁻³) |
|---|---|---|---|---|---|
| 1* | MU12 | 100 | 46.6 | 29 | 1800 |
| 2* | MU12 | 100 | 37 | 11 | 1491 |
| 3 | MU12 | 100 | 30.9 | 9.8 | 749 |
| 4* | MU12 + M5 | 15/85 | 61.8 | 16.5 | 1857 |
| 5* | MU12 + M5 | 25/75 | 61.8 | 25.3 | 2217 |
| 6* | MU12 + M5 | 40/60 | 61.8 | 25.1 | 2020 |
| 7 | MU12 + M5 | 25/75 | 46.6 | 17.7 | 168 |
| 8 | MU12 + M10 | 15/85 | 61.8 | 10.7 | 922 |
| 9* | MU12 + M10 | 20/80 | 61.8 | 10.2 | 1797 |
| 10* | MU12 + M10 | 25/75 | 61.8 | 11.7 | 2475 |
| 11 | MU12 + M15 | 25/75 | 61.8 | 10.9 | 880 |
| 12* | MU12 + M15 | 30/70 | 61.8 | 12.6 | 1198 |
| 13* | MU12 + M15 | 40/60 | 61.8 | 19.9 | 2515 |

*according to the invention

Samples 1-3 show that for a powder having a unimodal particle size distribution consisting of very fine particles, the reduction in the water content of the impregnating composition leads to a reduction in the static airflow resistance of the acoustic layer.

Samples 4-6 show that it is possible to replace a portion of the particles of very small size with larger, cheaper particles, as long as the solids content of the compositions is increased.

Comparison of samples 1 and 7 shows that replacing very small particles (MU12) with larger particles (M5) leads to a significant reduction in the static airflow resistance.

The series of samples 8-10 shows that for a bimodal distribution of calcium carbonate particles (MU12+M10)

the static airflow resistance is higher, the greater the fraction of very small particles (MU12).

This tendency is confirmed again by the series of samples 11-13.

These application examples show that it is possible to adjust the airflow resistance by acting on the solids content and/or on the particle size distribution of the mineral particles.

The invention claimed is:

1. A textile structure, comprising:
   (a) a nonwoven mat of glass fibers bound by a thermoset binder, wherein the nonwoven mat has a surface density of between 20 and 200 g/m2; and
   (b) a continuous acoustic layer comprising from 80% to 95% by weight of mineral particles and from 5% to 20% by weight of an elastomer and/or thermoplastic polymer binder,
   wherein the textile structure has an open porosity of greater than 3%, and a static airflow resistance, determined according to the standard ISO 9053 of between 1000 and 3000 N·s·m$^{-3}$,
   wherein said continuous acoustic layer at least partially impregnates said nonwoven mat, and
   wherein either:
   a particle size distribution of the mineral particles is a unimodal distribution having a median diameter by volume $D_{50}$ determined by laser particle size analysis of between 0.8 and 1.5 µm, a $D_{10}$ of between 0.1 and 0.5 µm, and a $D_{98}$ of between 5.5 and 6.5 µm, or
   a particle size distribution of the mineral particles is an at least bimodal distribution with a first mode located between 0.5 and 2.0 µm and a second mode located between 4 and 25 µm, and a $D_{10}$ of between 0.1 and 0.5 µm.

2. The textile structure as claimed in claim 1, wherein the continuous acoustic layer has a surface density of between 100 g/m$^2$ and 400 g/m$^2$.

3. The textile structure as claimed in claim 1, wherein the nonwoven mat has a surface density of between 25 and 150 g/m$^2$.

4. The textile structure as claimed in claim 1, wherein at least 90% by number of the glass fibers forming the nonwoven mat have a length of between 5 mm and 12 cm.

5. The textile structure as claimed in claim 1, wherein the glass fibers forming the nonwoven mat have an average diameter of between 3 and 30 µm.

6. The textile structure as claimed in claim 1, wherein the textile structure has an open porosity between 4% and 60%.

7. The textile structure as claimed in claim 1, wherein the continuous acoustic layer has a surface density of between 150 g/m$^2$ and 350 g/m$^2$.

8. The textile structure as claimed in claim 1, wherein the nonwoven mat has a surface density of between 30 and 100 g/m$^2$, and wherein at least 90% by number of the glass fibers forming the nonwoven mat have a length of between 1 cm and 11 cm.

9. The textile structure as claimed in claim 1, wherein the mineral particles are:
   based on at least one selected from the group consisting of titanium oxide, magnesium oxide and/or aluminum oxide;
   made of calcium carbonate; or
   selected from the group consisting of kaolins, dolomites, and talcs.

10. The textile structure as claimed in claim 1, wherein the glass fibers forming the nonwoven mat have an average diameter of between 5 and 20 µm.

11. The textile structure as claimed in claim 1, wherein said structure consists of said nonwoven mat of glass fibers bound by a thermoset binder and said continuous acoustic layer.

12. The textile structure as claimed in claim 1, wherein the textile structure has a static airflow resistance, determined according to the standard ISO 9053 of between 1198 and 3000 N·s·m$^{-3}$.

13. The textile structure as claimed in claim 1, wherein the particle size distribution of the mineral particles is a unimodal distribution having a median diameter by volume $D_{50}$ determined by laser particle size analysis of between 0.8 and 1.5 µm, a $D_{10}$ of between 0.1 and 0.5 µm, and a $D_{98}$ of between 5.5 and 6.5 µm.

14. The textile structure as claimed in claim 1, wherein the particle size distribution of the mineral particles is an at least bimodal distribution with a first mode located between 0.5 and 2.0 µm and a second mode located between 4 and 25 µm, and a $D_{10}$ of between 0.1 and 0.5 µm.

15. A process for manufacturing a textile structure as claimed in claim 1, comprising
   applying a layer of an aqueous impregnating composition to at least one face of a nonwoven mat of glass fibers bound by a thermoset binder,
      wherein the nonwoven mat has a surface density of between 20 and 200 g/m$^2$, and
      wherein the aqueous impregnating composition comprises a mixture of 80% to 95% by weight of solids of mineral particles and of 5% to 20% by weight of solids of a thermoplastic polymer and/or elastomer binder in latex form, wherein the aqueous impregnating composition has a solids content of between 35% and 70% by weight, and wherein either:
      a particle size distribution of the mineral particles is a unimodal distribution having a median diameter by volume $D_{50}$ determined by laser particle size analysis of between 0.8 and 1.5 µm, a $D_{10}$ of between 0.1 and 0.5 µm, and a $D_{98}$ of between 5.5 and 6.5 µm, or
      a particle size distribution of the mineral particles is an at least bimodal distribution with a first mode located between 0.5 and 2.0 µm and a second mode located between 4 and 25 µm, and a $D_{10}$ of between 0.1 and 0.5 µm; and
   drying and/or crosslinking the layer of the aqueous impregnating composition so as to obtain a continuous acoustic layer comprising from 80% to 95% by weight of mineral particles and from 5% to 20% by weight of an elastomer binder.

16. The process as claimed in claim 15, wherein the nonwoven mat has a loss on ignition of between 5% and 40% by weight.

17. The process as claimed in claim 15, wherein the nonwoven mat has a static airflow resistance, determined according to the standard ISO 9053, of less than 50 N·s·m$^{-3}$ and an air permeability of between 5000 and 6000 L/(m$^2$·s).

18. The process as claimed in claim 15, wherein the aqueous impregnating composition has a solids content of between 45% and 70% by weight.

19. A laminated acoustic ceiling panel or acoustic wall panel, comprising:
   a board made of a rigid material comprising a plurality of perforations; and
   a textile structure as claimed in claim 1, bonded to a single face of the perforated board so as to seal all of the perforations.

20. The laminated panel as claimed in claim 19, wherein the rigid material of the board is at least one selected from the group consisting of plaster, a metal, and a plastic.

* * * * *